United States Patent [19]

Guenther et al.

[11] Patent Number: 4,460,903

[45] Date of Patent: Jul. 17, 1984

[54] INK JET CATCHER

[75] Inventors: Kenneth L. Guenther, Park Ridge; Edward H. Zemke, Chicago, both of Ill.; Gerald D. Warden, Easton, Pa.

[73] Assignee: Bell & Howell Company, Chicago, Ill.

[21] Appl. No.: 399,388

[22] Filed: Jul. 19, 1982

[51] Int. Cl.[3] .............................................. G01D 15/18

[52] U.S. Cl. .................................. 346/75; 346/140 R

[58] Field of Search ............................... 346/75, 140 IJ

[56] References Cited

U.S. PATENT DOCUMENTS 3,813,675 5/1974 Steffy et al. .......................... 346/75

3,836,914 9/1974 Duffield ................................ 346/75

4,010,477 3/1977 Frey ...................................... 346/75

*Primary Examiner*—A. D. Pellinen

*Assistant Examiner*—Todd DeBoer

*Attorney, Agent, or Firm*—Neal C. Johnson; Alan H. Haggard; Alan B. Samlan

[57] ABSTRACT

An improvement in an ink jet printing system which uses a catcher or gutter to intercept drops of ink deflected from the iñk jet printing stream. The ink drop catcher serves to remove the drops of ink which have collected on the face of the catcher by means of capillary paths extending from the face of the catcher to a porous block. The porous block may be connected to a vacuum souce for removing the ink from the printing head.

1 Claim, 5 Drawing Figures

INK JET CATCHER

BACKGROUND OF THE INVENTION

This invention relates to ink jet printers and more particularly to a system for catching and removing drops of ink from the ink jet printing stream.

The inventive device may be used on ink jet printers of numerous designs. One such design is disclosed in the ink jet printer technology illustrated in U.S. Pat. Nos. 3,416,151; 3,673,601; and 3,737,914 all by Hellmuth Hertz. This technology is further described in U.S. Pat. No. 4,122,457 issued to Erikson et al.

The above printing systems comprise an ink jet printer head having a pressurized source of ink ejected through a capillary nozzle. The ink jet breaks up into a stream of fine droplets after being ejected from the ink jet nozzle. The nozzle is mechanically oscillated to trace a cyclically repetitive path above a moving paper or other printing media. The output stream of ink droplets passes through a hollow control electrode which electrically charges selected portions of the stream of droplets. The stream then passes a deflection electrode which deflects the portions of the stream which are electrically charged. By controlling the voltage on the control electrode as the nozzle is mechanically oscillated, the droplets striking the printing medium can be controlled to trace the desired characters formed on the printing medium.

The droplets which are deflected are caught in a catcher or gutter which collects the unused drops. This unused ink is then removed from the gutter and is either disposed of or recycled through the printing system. Usually, the ink is removed from the gutter by means of a porous block located near the gutter. The porous block serves as a blotter to remove the ink. The ink may be removed or evacuated from the block by connecting a vacuum source to that block. The gutter is provided with a sharp edge which is used to establish a threshold between drops of ink which are not deflected and allowed to strike the printing media and those which are deflected and not allowed to strike the media. As drops of ink cross the gutter, some drops strike the sharp edge and tend to build up on the outer face of the gutter. This build-up of drops on the outer face of the gutter negates the effect of the sharp edge. The results are unwanted drops intermittently dripping onto the printing media, misting of the ink jet printing stream which results in print character degradation, and failure to cleanly cut through the ink jet stream to clearly and cleanly define the drops which are intended to be printed with and those which are to be caught.

In the past, attempts have been made to treat the edge of the gutter or catcher with chemicals or special treatments to the metal in an attempt to get the metal to "wet" or disperse the build-up of drops. This would provide a means for quickly and easily removing drops as they form on the face of the gutter. However, attempts with chemical application have proved completely unsatisfactory as the chemicals wear off after short periods of use and the "wetting" action diminishes to a point of providing unsatisfactory results.

SUMMARY OF THE INVENTION

Accordingly, an object of this invention is to provide an ink jet printing device having an improved gutter which catches and removes unwanted drops from the printing stream.

Another object of the invention is to provide an ink jet printing device of the above type which dispenses drops of ink which tend to build up on the face of the gutter.

It is also an object to provide such an ink catching and removal means which is simple in construction, trouble free to use, and inexpensive to manufacture.

It is a related object to provide such a device with a minimum number of additional components to the ink jet printing machine.

Another object is to provide a means for removing ink drops from the edge of an ink catcher without the use of chemicals as wetting agents.

Yet another object is to provide a new and novel ink jet catcher having capillary paths along at least one face of the catcher to prevent unwanted drop build up at the face of the catcher.

Other objects and advantages will become apparent on the reading of the detailed description of the drawings.

According to the specific embodiment illustrated in the drawings herein and discussed in detail below, a catcher or gutter member is placed adjacent to the ink jet stream. The catcher serves as a trough to collect the drops of ink deflected from the ink jet stream. The side or end of the catcher next to the ink jet stream has a face with a sharp edge. This edge is intended to cleanly divide the ink droplets which are deflected from the droplets which are not deflected. The other end of the catcher is embedded in a porous maaterial which absorbs the collected drops of ink. The porous material is then evacuated by a suction device which recirculates or disposes of the collected ink. Advantageously, there are provided capillary paths or channels on the outer face of the catcher extending from the edge adjacent the stream to the porous material. As drops begin to form on the face of the catcher, the channels serve to break the surface tension of the drops of ink and serve to disperse the drops. As a result, the ink is carried away by means of capillary action into the porous material. Thus the capillary paths eliminate the buildup of drops on the outer face of the catcher.

DESCRIPTION OF THE INVENTION

The ink jet printing mechanisms shown herein continuous ink jet printers which direct a continuous stream of ink droplets toward a printing medium. The preferred embodiment uses a pressurized source of ink as drive element to force the ink through a nozzle towards the printing medium. It will be understood, however, that other types of continuous ink jet printers may be used with the present invention.

In the present embodiment, characters are formed by mechanically oscillating the nozzle with a galvanometric movement to follow a cyclically repetitive path, e.g., a sine wave, while the printing medium moves past the nozzle at a right angle. The stream of continuous ink forced from the tip of the nozzle by the drive element breaks into a stream of small droplets of ink which pass through a charge tunnel assembly which electrically charges selected portions of the stream of droplets of ink. This stream of ink droplets then passes by a deflection electrode which deflects these portions of the stream of droplets which are electrically charged. The portions of the ink droplet stream which are not deflected form the printed characters on the printing medium while the portions of the stream which are deflected are collected by a gutter.

Figure 1:
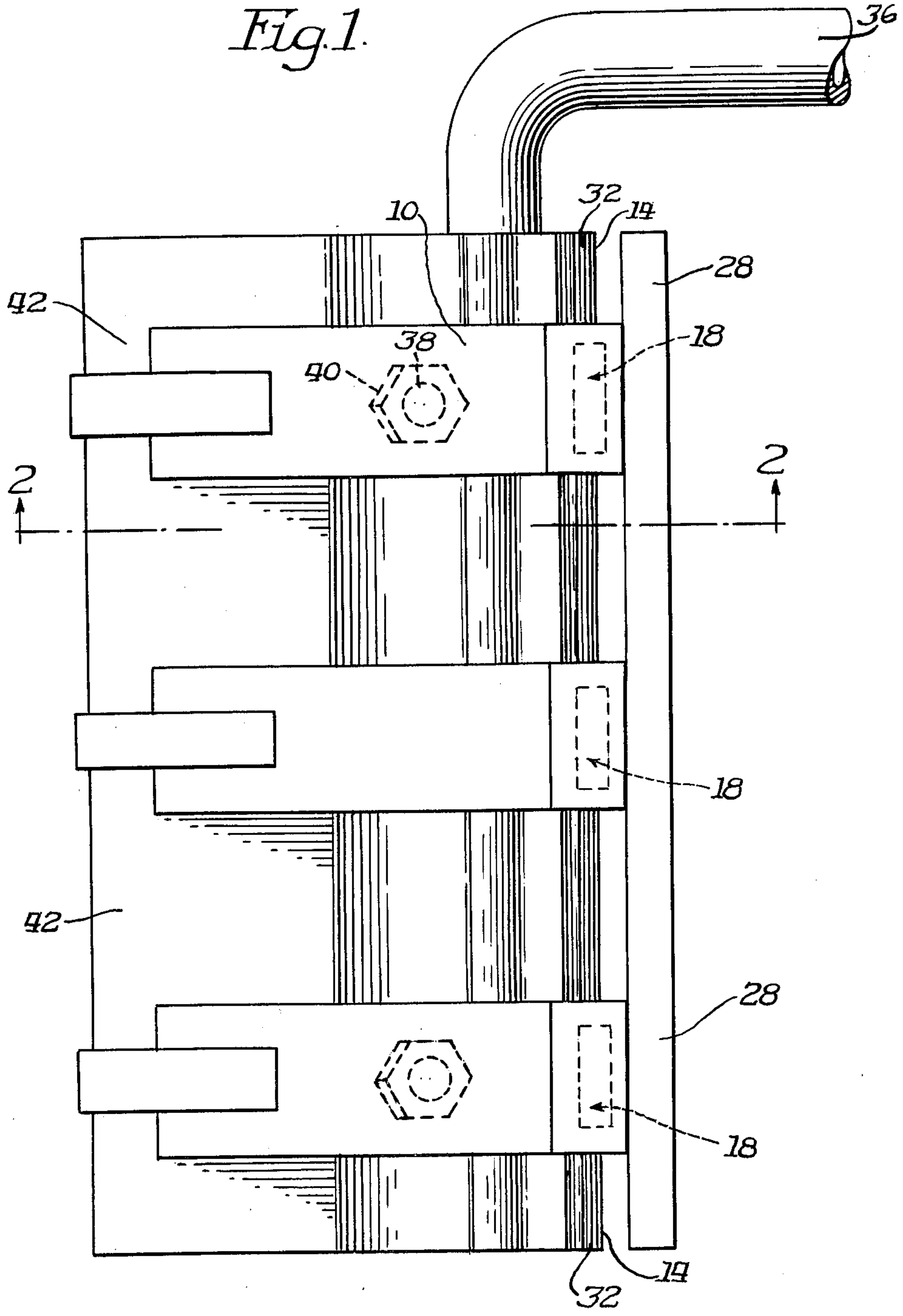
FIG. 1 is a top view of an ink jet printing head having embodied therein the inventive ink jet catcher.
Figure 2:
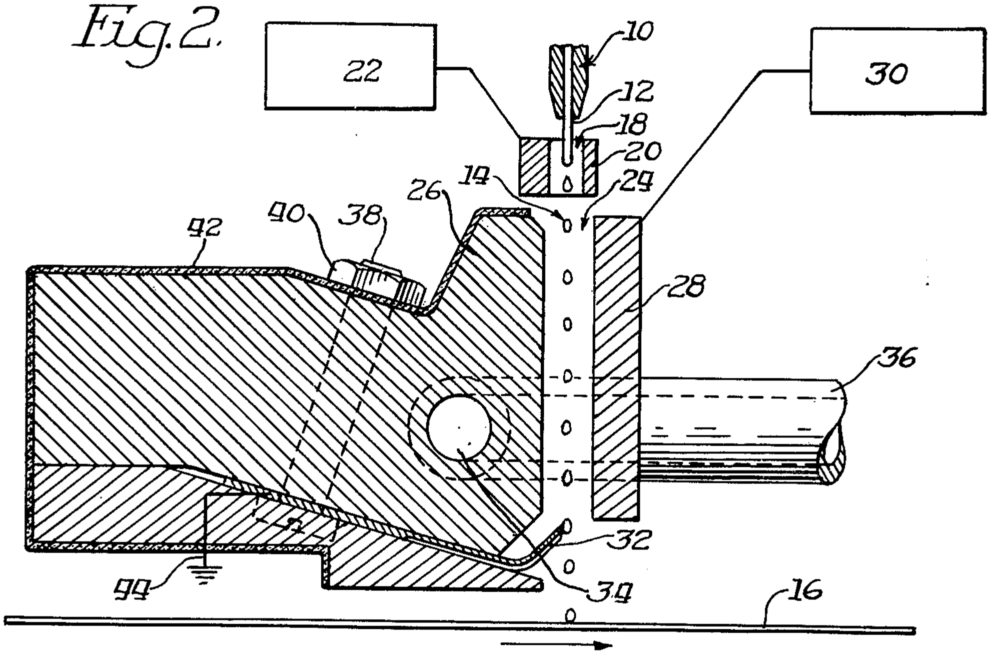
FIG. 2 is a partially schematic cross-sectional view taken along line 2—2 of FIG. 1.

More particularly, as can be seen from FIGS. 1 and 2, there is shown an ink jet printing mechanism according to the present invention comprising a nozzle 10, a charge tunnel assembly 18, a deflection electrode 28, and a gutter 32. A source of pressured ink fluid (not shown) forces a stream of ink 12 to be driven from nozzle 10 towards the printing medium 16. This continuous stream of ink breaks down into a stream of very fine ink droplets 14. This latter stream of droplets passes through charge tunnel 18 which selectively charges portions of the ink droplet stream by means of energizing an electrode 20 surrounding or embedded within the charge tunnel 18. A voltage source and switching device 22 controls the voltage applied to electrode 20 which in turn determines which portions of the stream of droplets will be charged. The stream 14 then passes through a deflection tunnel 24 which is formed by a porous block 26 on one side and an electrode 28 on the other side. The electrode 28 is charged by means of a high potential voltage source 30.

During the printing mode, the voltage source and switching device 22 is turned off. Thus, the stream 14 is uncharged and will proceed straight down through the deflection tunnel 24 and stike the printing medium 16.

During the non-printing mode, the voltage source and switching device 22 is turned on. Since the stream 14 is charged, it will be deflected into the gutter as it passes through the deflection tunnel.

Figure 3:
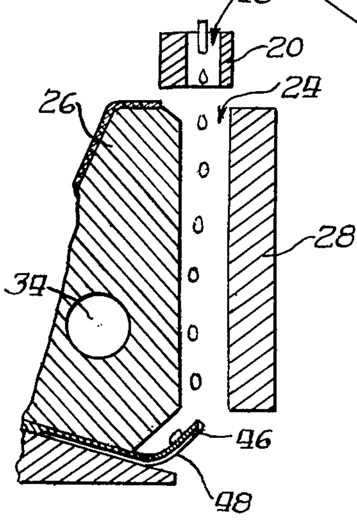
FIG. 3 is a cross-sectional view with portions removed of the jet catcher illustrating the formation and removal of a drop at the edge.

As the stream 14 is switched between the printing and non-printing conditions, the drops continually cross the edge 14 of the gutter 32. The edge 14 is formed as a sharp cutting edge to distinctly cut the stream 14 to aid in producing clear, crisp, clean characters on the printing medium 16. However, as the stream traverses the edge 14, drops tend to form on the edge 14. This is illustrated in FIG. 3 as drop 46. If nothing is done to prohibit this drop build-up, the drops which form tend to run down on the outer face of the gutter. Furthermore, the sharp edge 14 of the gutter 32 is now lost and the stream 14 is not cut cleanly. This produces "misting" of the drops resulting in character degradation upon printing.

Figure 4:
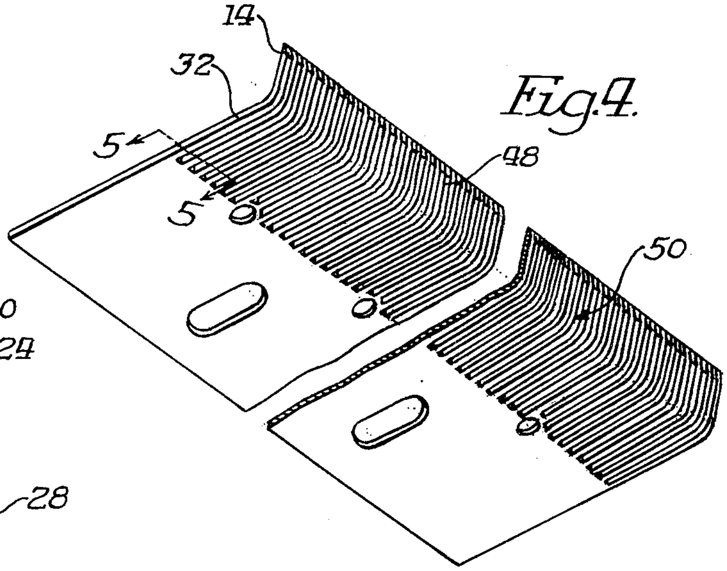
FIG. 4 is a perspective view with portions removed of the ink jet catcher with the inventive means for prohibiting ink drop build up at the edge.
Figure 5:
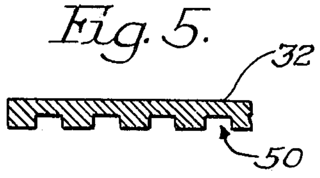
FIG. 5 is a cross-sectional view with portions removed taken along line 5—5 of FIG. 4.

As can be best seen from FIGS. 4 and 5, the present invention overcomes this problem by providing gutter 32 with numerous capillary paths or channels 50 along its entire front surface 48. These paths provide a ready means for removal of ink drops, such as drop 46, as they begin to build along the outer face. Thus, before print degradation results from any drop build up along the outer face, the drops run along the front surface 48 in the capillary paths 50. They are then absorbed into the porous block 26 and removed by means of the vacuum channel 34. Although the capillary paths are shown on the surface 48, they could also be advantageously provided on the opposite surface of the gutter 32.

Although the gutter or catcher 32 is illustrated as being a substantially flat, L-shaped plate, it could also be a cylindrical catcher encircling a stream of drops. The particular configuration of the catcher is not an important element of the invention. The important point is that capillary paths are provided from near the edge striking the stream to a point removed from the edge to provide a means to prevent undesirable drops from forming on the face. This permits the drops to be collected and appropriately removed.

Thus, it is apparent that there has been provided in accordance with the invention, an ink jet catcher that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In an ink jet printing device wherein printing occurs through a stream of ink made from individual drops with generally L-shaped gutter means for selectively intercepting drops from the stream, one leg of the L-shaped gutter means having an edge adjacent to the stream, the improvement comprising a series of adjacent parallel capillary paths extending downwardly in the direction of flow of the stream, the capillary paths carrying away droplets of ink as they form on the edge of the gutter means as the stream passes back and forth across the edge, a porous block positioned on the leg opposite the leg adjacent the stream, the porous block absorbing and providing a storage means for ink caught and removed, and wherein the capillary paths extend from the edge of the L-shaped gutter means to the porous block.

* * * * *